United States Patent [19]
Hrusch

[11] Patent Number: 5,996,979
[45] Date of Patent: *Dec. 7, 1999

[54] AIRCRAFT SHOCK STRUT HAVING AN IMPROVED PISTON HEAD

[75] Inventor: Louis C. Hrusch, Chesterland, Ohio

[73] Assignee: The B. F. Goodrich Company, Richfield, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/590,716

[22] Filed: Jan. 24, 1996

[51] Int. Cl.[6] .................................................. F16F 5/00
[52] U.S. Cl. .................................. 267/64.11; 267/64.26; 188/282.1
[58] Field of Search ........................... 267/64.11, 64.22, 267/64.26, 217, 221; 188/317, 322.15, 289, 285, 282.1, 282.8; 244/104 FP, 108

[56] References Cited

U.S. PATENT DOCUMENTS

| | | | |
|---|---|---|---|
| 3,647,239 | 3/1972 | Katsumori | 267/64.11 X |
| 3,888,436 | 6/1975 | Sealey | 244/104 FP |
| 4,524,929 | 6/1985 | Gebhard | 244/104 FP |
| 4,595,159 | 6/1986 | Hrusch | 244/104 FP |
| 4,826,094 | 5/1989 | Whiteley | 267/221 X |

Primary Examiner—Robert J. Oberleitner
Assistant Examiner—Pamela J. Lipka
Attorney, Agent, or Firm—Kevin L. Leffel

[57] ABSTRACT

The invention is in the field of aircraft shock struts, of the type having a piston cylinder and a piston head, for slowing movement of an aircraft structure toward the ground, particularly during landing or take-off. The invention provides a more constant change in pressure across the piston head, that is generally independent of piston head speed, relative to the prior art. The piston head has a damped valve poppet received within the piston head moveable from a first position wherein the damped valve poppet covers a pressure relief orifice to a second position that uncovers a pressure relief orifice, thereby providing a more constant change in pressure across the piston head.

19 Claims, 7 Drawing Sheets

AIRCRAFT SHOCK STRUT HAVING AN IMPROVED PISTON HEAD

BACKGROUND

The invention is in the field of aircraft shock struts for slowing movement of an aircraft structure toward the ground, particularly during landing or take-off.

Shock struts are a common and necessary component in most aircraft landing gear assemblies. Such shock struts generally utilize an "air cover oil" arrangement wherein a trapped volume of gas is compressed as the shock strut is compressed, and a volume of liquid (usually oil) is metered through an orifice. The air provides suspension and spring rate, and the oil provides a fluid amplified force under dynamic conditions. Some shock struts have a fluid amplified force that depends on the rate at which the shock strut is compressed, of which the well known tapered rod within a fixed orifice is an example (also known as a "metering pin"). Other shock struts provide a fluid amplified force that is generally not dependent on the rate at which the shock strut is compressed. The invention relates to this type of shock strut. An example of a prior art aircraft shock strut having this characteristic is presented in FIG. 1 of the drawings.

Figure 1:
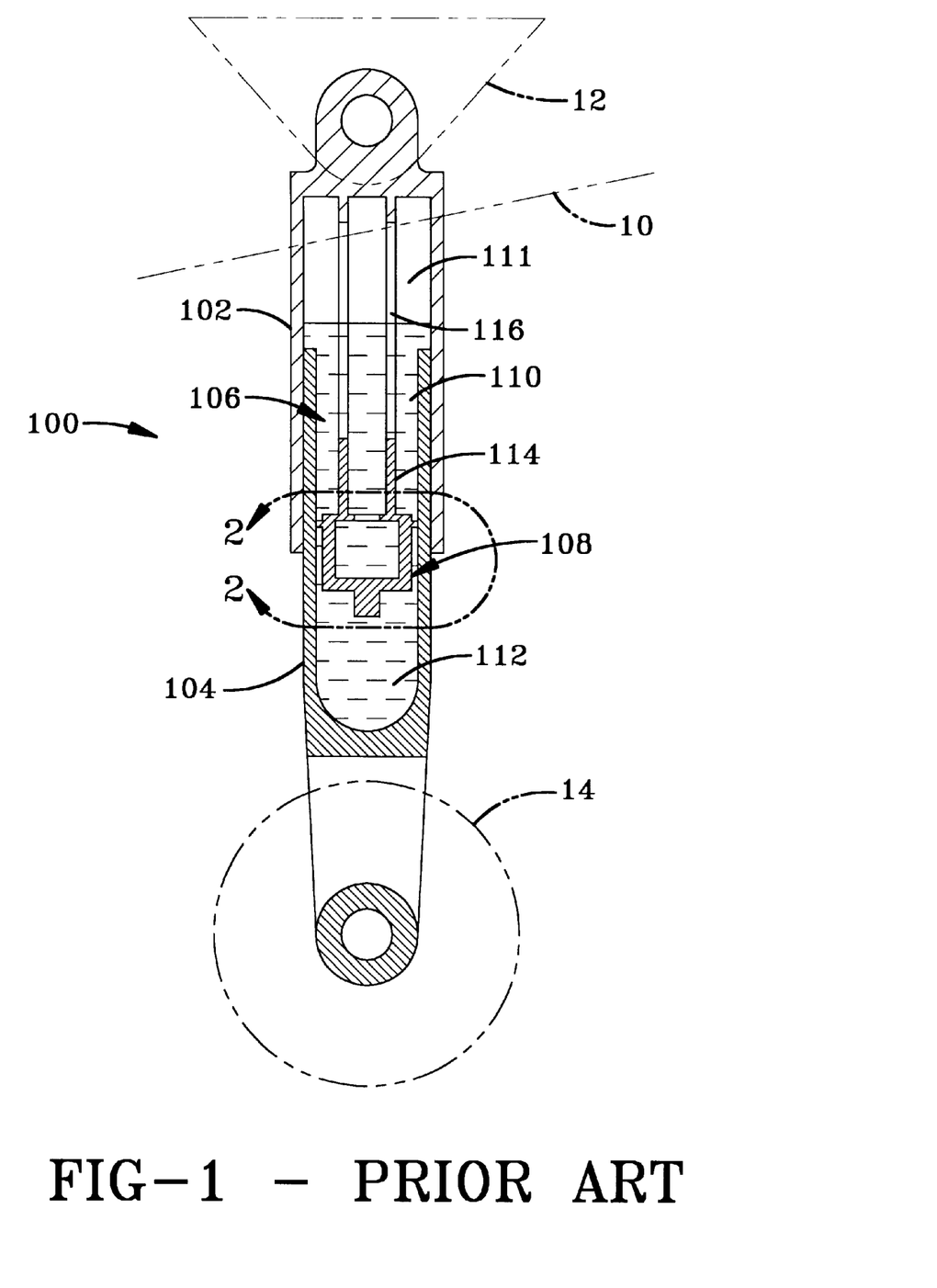
FIG. 1 presents a schematical cross-sectional view of a prior art shock strut.

FIG. 1 presents a simplified schematic cross-section, not to scale, of prior art aircraft shock strut 100, shown mounted to an aircraft structure 10 by an attachment structure 12. A wheel and tire assembly 14 is attached to the shock strut 100. The aircraft structure 10, attachment structure 12, and wheel and tire assembly are shown in phantom, and structures such as locking mechanisms and retracting mechanisms are not shown in FIG. 1 in order to avoid obscuring shock strut 100. Various arrangements of such structures are very well known in the art, and are not critical in describing shock strut 100.

Still referring to FIG. 1, shock strut 100 is generally cylindrical, having an elongate piston structure 102, and a hollow elongate cylinder structure 104. The cylinder structure 104 receives the piston structure 102 in a manner that permits relative telescoping movement between the cylinder structure 104 and the piston structure 102. The piston structure 102 and the cylinder structure 104 define a sealed elongate cavity 106 at least partially filled with a liquid (shown as dashed lines). A portion 111 of cavity 106 is filled with a gas, the shock strut 100 being a member of the well known "air over oil" class of shock struts. Various sealing arrangements between piston structure 102 and 104 that allow telescoping movement between piston structure 102 and 104 while maintaining a seal are well known in the art, and need not be repeated here. A piston head 108 is attached to the piston structure via a support tube 114 that divides the elongate cavity 106 into an upper cavity 110 and a lower cavity 112. Support tube 114 has openings 116 so that all parts of upper cavity 110 are in fluid communication with each other. Compressing shock strut 100 causes piston structure 102 to move into cylinder structure 104 thereby reducing the volume of cavity 106 which compresses the portion 111 filled with gas. The portion 111 filled with gas thereby provides a spring rate. In addition, piston head 108 has at least one fixed orifice (not shown in FIG. 1), and fluid is pumped from lower cavity 112 to upper cavity 110 as the shock strut 100 is compressed, thereby increasing resistance to compression through fluid amplification while simultaneously dissipating compression energy. These features are presented in more detail in FIG. 2.

Figure 2:
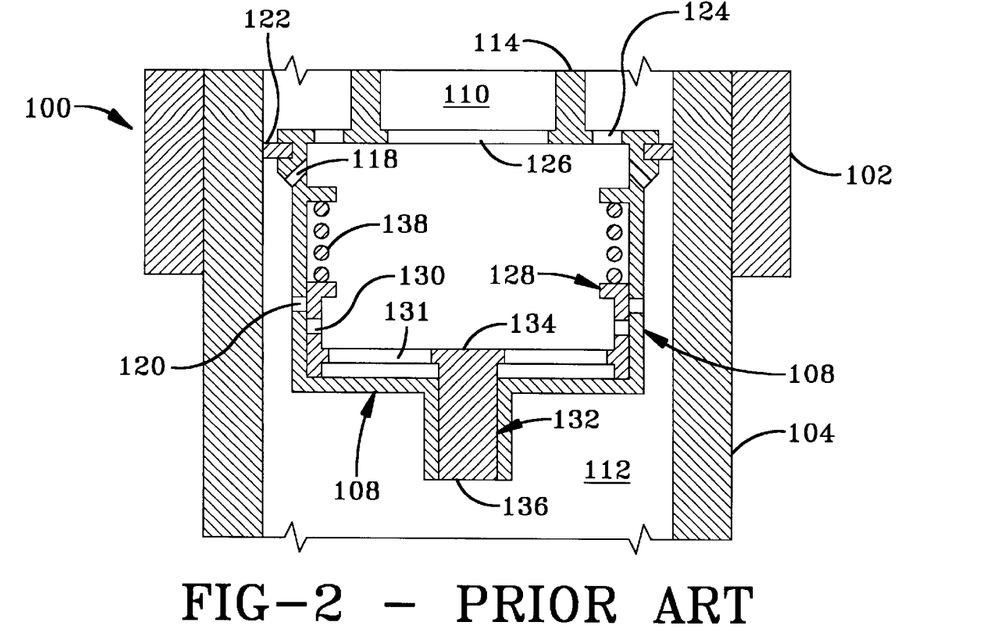
FIG. 2 presents a detailed cross-sectional view of the piston head portion of FIG. 1.

Referring now to FIG. 2, a detailed view of the piston head 108 is presented. Piston head 108 is hollow, and has one or more openings 124 and 126 so that upper cavity 110 extends inside piston head 108. The piston head 108 has at least one fixed 118 orifice and at least one pressure relief orifice 120. Relative telescoping movement of the cylinder structure 104 and the piston structure 102 toward each other increases pressure in the lower cavity 112 thereby developing a change in pressure across the piston head 108 that causes the liquid to flow from the lower cavity 112 to the upper cavity 110 through the fixed orifice 118. Piston head 108 has circumferential seal 122 that seals the upper cavity 110 from the lower cavity 112 while permitting relative sliding movement between the piston head 108 and the cylinder structure 104. Piston head 108 and circumferential seal 122 define an effective hydraulic area across which the change in pressure acts thereby adding to the overall resistance to compression of shock strut 100. Piston head 108 also dissipates compression energy by metering the liquid through fixed orifice 118 resulting in dissipation of at least part of the work required to telescope the piston structure 102 toward the cylinder structure 104. Part of the work is stored as recoverable spring energy in the portion 111 filled with gas (FIG. 1) which resiliently suspends the aircraft structure 10 while taxiing on the ground, and also allows the piston structure 102 and cylinder structure 104 to return to their original positions after the compression force is removed, i.e, after take-off. Such operation is well known in the art.

Piston head 108 has a valve poppet 128 received within the piston head 108 moveable from a first position wherein the valve poppet 128 covers the pressure relief orifice 120 to a second position that uncovers the pressure relief orifice 120. The valve poppet 128 is shown in the first position in FIG. 2. Pressure relief orifice 120 is uncovered when the valve poppet is in the second position by providing the valve poppet 128 with at least one venting orifice 130 that aligns with the pressure relief orifice when the valve poppet 128 is in the second position. Valve poppet 128 has a cylindrical probe 132 having an upper portion 134 exposed to liquid in the upper cavity 110 and a lower portion 136 exposed to liquid in the lower cavity 112. Openings 131 in valve poppet 128 place the underside of valve poppet 128 in fluid communication with the rest of upper cavity 126. Cylindrical probe 132 is closely fitted to a mating surface on the piston head 108 to provide an effective seal between the upper cavity 110 and lower cavity 112 under dynamic conditions when the piston structure 102 and cylinder structure 104 rapidly move together. Under dynamic conditions, the upper and lower portions 134 and 136, and piston head 108 cooperate to define a hydraulic area across which the change in pressure acts and develops an upward force on the valve poppet 128. With the cylindrical probe 132 the hydraulic area is the circular cross-sectional area of the probe.

Still referring to FIG. 2, a spring 138 urges the valve poppet 128 into the first position with a predetermined force. The change in pressure acting across the lower portion 136 and the valve poppet upper portion 134 develops a force acting against the spring 138 that moves the valve poppet 128 from the first position to the second position upon the force exceeding the predetermined force. Moving the valve poppet 128 to the second position uncovers the pressure relief orifice 120 via venting orifice 130 upon which the change in pressure causes the liquid to flow from the lower cavity 112 to the upper cavity 110 through the pressure relief orifice 120 and venting orifice 130. The valve poppet 128 begins to move to the second position when the pressure across the piston head 108 exceeds a predetermined value due to the fixed orifice 118 being unable to pass enough fluid to keep the change in pressure from exceeding the predetermined value, so the pressure relief orifice 120 opens to provide an additional flow path. Opening the pressure relief orifice 120 decreases the change in pressure across the piston head. The spring 128 returns the valve poppet 128 to the first position upon the force decreasing to less than the predetermined force. The valve poppet may oscillate between the first and second positions in response to loading conditions imposed on the shock strut, thereby maintaining a generally constant predetermined change in pressure across the piston head 108. The valve poppet 128 thereby acts as a regulator. The change in pressure is determined by the predetermined spring force, and the hydraulic area across the probe 132 upon which the change in pressure acts. Thus, the fluid amplification force generated by the shock strut 100 is generally independent of the speed with which the piston structure 102 moves toward the cylinder structure 104. The various orifices are sized based on the worst case, corresponding to the greatest piston head speed and stroking force. The predetermined change in pressure is determined by the needed stroking force in the worst case, and the orifices are designed to provide the predetermined change in pressure, or a little less since valve poppet action actually provides a band within which the change in pressure is maintained, and the center of the band generally corresponds to the predetermined change in pressure.

The spring 138 determines the predetermined force at which the valve poppet 128 begins to move. A helical spring 138 is used which has a spring constant, resulting in some change in the spring force as the valve poppet moves from the first position to the second position. The change in spring force from the first position to the second position is minimized in order to provide a narrow target band for the generally constant predetermined change in pressure across the piston head 108. The change in spring force may be minimized by minimizing the spring constant of helical spring 138.

Though shock strut 100 is certainly safe and effective, it has a tendency to generate an oscillatory suspension load in some situations. For example, a sudden impact on the shock strut induced, for example, by the wheel and tire assembly 14 striking a depression in the runway results in an under damped jouncing motion in the cylinder structure 104. In some aircraft, the motion is not objectionable, and the tire is capable of absorbing and mitigating the motion until it damps out due to damping within the tire and low levels of damping inherent in shock strut 100. In some aircraft, however, the motion is objectionable, and may render shock strut 100 unacceptable. In addition, the tendency to generate an oscillatory suspension load renders shock strut 100 unacceptable for certain other applications. For example, shock strut 100 is unacceptable for use with an aircraft tail skid that has no tire to absorb and mitigate the jouncing motion. Without a tire, the jouncing motion is directly transferred to the aircraft structure. Therefore, an improved shock strut similar to shock strut 100 is desired having a reduced or eliminated tendency to generate an oscillatory suspension load following a sudden impact.

SUMMARY OF THE INVENTION

According to an aspect of the invention, a shock strut is provided that attaches to an aircraft structure for slowing movement of the aircraft structure toward the ground, the shock strut comprising:

an elongate piston structure;

a hollow elongate cylinder structure, the cylinder structure receiving the piston structure in a manner that permits relative telescoping movement between the cylinder structure and the piston structure, the piston structure and the cylinder structure defining a sealed elongate cavity at least partially filled with a liquid;

a piston head attached to the piston structure that divides the elongate cavity into an upper cavity and a lower cavity, the piston head having at least one fixed orifice and at least one pressure relief orifice, wherein relative telescoping movement of the cylinder structure and the piston structure toward each other increases pressure in the lower cavity thereby developing a change in pressure across the piston head that causes the liquid to flow from the lower cavity to the upper cavity through the fixed orifice;

a damped valve poppet received within the piston head moveable from a first position wherein the damped valve poppet covers the pressure relief orifice to a second position that uncovers the pressure relief orifice, the damped valve poppet having an additional damper device that damps movement of the damped valve poppet, the damped valve poppet having an upper portion exposed to liquid in the upper cavity and a lower portion exposed to liquid in the lower cavity; and, a spring urging the damped valve poppet into the first position with a predetermined force, the change in pressure acting across the damped valve poppet lower portion and the damped valve poppet upper portion and developing a force acting against the spring that moves the damped valve poppet from the first position to the second position upon the force exceeding the predetermined force and uncovering the pressure relief orifice upon which the change in pressure causes the liquid to flow from the lower cavity to the upper cavity through the pressure relief orifice thereby decreasing the change in pressure, the spring returning the damped valve poppet to the first position upon the force decreasing to less than the predetermined force.

According to another aspect of the invention, a method is provided for slowing movement of an aircraft structure toward the ground, the method comprising the steps of:

compressing a shock strut disposed between the aircraft structure and the ground, the shock strut comprising, an elongate piston structure, a hollow elongate cylinder structure, the cylinder structure receiving the piston structure in a manner that permits relative telescoping movement between the cylinder structure and the piston structure, the piston structure and the cylinder structure defining a sealed elongate cavity at least partially filled with a liquid, a piston head attached to the piston structure that divides the elongate cavity into an upper cavity and a lower cavity, the piston head having at least one fixed orifice and at least one pressure relief orifice, wherein compressing the shock strut telescopes the cylinder structure and the piston structure toward each other and increases pressure in the lower cavity thereby developing a change in pressure across the piston head that causes the liquid to flow from the lower cavity to the upper cavity through the fixed orifice, a damped valve poppet received within the piston head moveable from a first position wherein the damped valve poppet covers the pressure relief orifice to a second position that uncovers the pressure relief orifice, the damped valve poppet having an additional damper device that damps movement of the damped valve poppet, the damped valve poppet having an upper portion exposed to liquid in the upper cavity and a lower portion exposed to liquid in the lower cavity, and a spring urging the damped valve poppet into the first position with a predetermined force, the change in pressure acting across the damped valve poppet lower portion and the damped valve poppet upper portion and developing a force acting against the spring that moves the damped valve poppet from the first position to the second position upon the force exceeding the predetermined force and uncovering the pressure relief orifice upon which the change in pressure causes the liquid to flow from the lower cavity to the upper cavity through the pressure relief orifice thereby decreasing the change in pressure, the spring returning the damped valve poppet to the first position upon the force decreasing to less than the predetermined force.

According to yet another aspect of the invention, an apparatus is provided for slowing movement of an aircraft structure toward the ground, the apparatus comprising:

(a) a shock strut, the shock strut comprising, an elongate piston structure, a hollow elongate cylinder structure, the cylinder structure receiving the piston structure in a manner that permits relative telescoping movement between the cylinder structure and the piston structure, the piston structure and the cylinder structure defining a sealed elongate cavity at least partially filled with a liquid, a piston head attached to the piston structure that divides the elongate cavity into an upper cavity and a lower cavity, the piston head having at least one fixed orifice and at least one pressure relief orifice, wherein relative telescoping movement of the cylinder structure and the piston structure toward each other increases pressure in the lower cavity thereby developing a change in pressure across the piston head that causes the liquid to flow from the lower cavity to the upper cavity through the fixed orifice, a damped valve poppet received within the piston head moveable from a first position wherein the damped valve poppet covers the pressure relief orifice to a second position that uncovers the pressure relief orifice, the damped valve poppet having an additional damper device that damps movement of the damped valve poppet, the damped valve poppet having an upper portion exposed to liquid in the upper cavity and a lower portion exposed to liquid in the lower cavity, and a spring urging the damped valve poppet into the first position with a predetermined force, the change in pressure acting across the damped valve poppet lower portion and the damped valve poppet upper portion and developing a force acting against the spring that moves the damped valve poppet from the first position to the second position upon the force exceeding the predetermined force and uncovering the pressure relief orifice upon which the change in pressure causes the liquid to flow from the lower cavity to the upper cavity through the pressure relief orifice thereby decreasing the change in pressure, the spring returning the damped valve poppet to the first position upon the force decreasing to less than the predetermined force;

(b) an attachment structure that attaches the shock strut to the aircraft structure; and, (c) an impact structure attached to the shock strut configured to transfer impact forces from the ground to the shock strut.

DETAILED DESCRIPTION OF THE INVENTION

Figure 3:
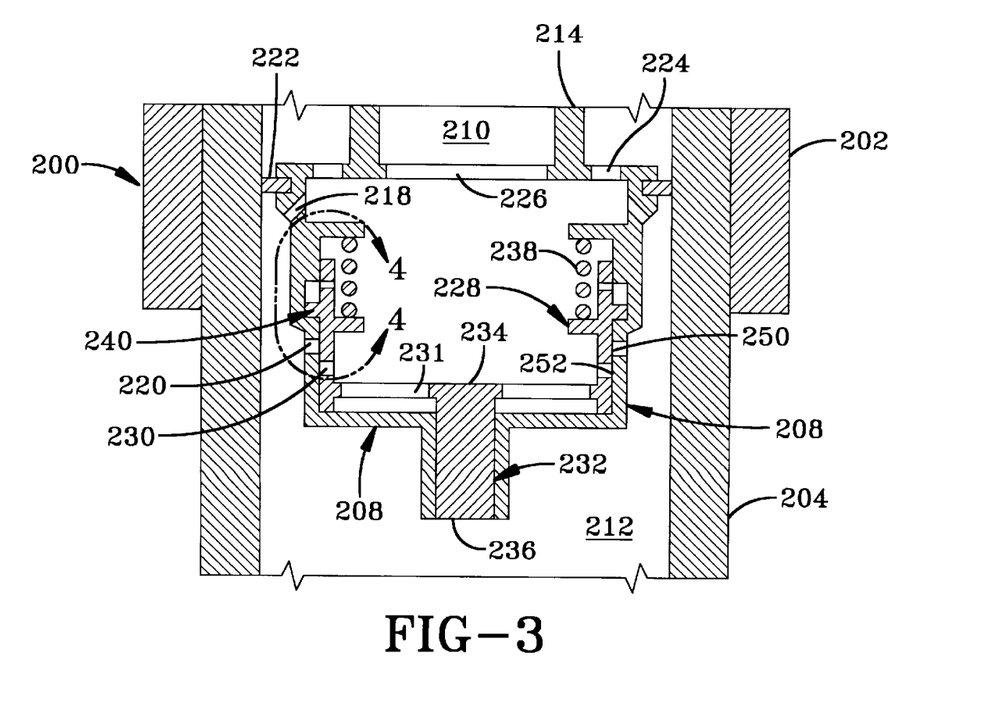
FIG. 3 presents a detailed cross-sectional view of a piston head according to an aspect of the invention.

Referring to FIGS. 3–7, various aspects of the invention are illustrated, not to scale, and wherein like components are numbered alike in the various views. As used herein, the terms "upper" and "lower" refer to relative position, and are intended to facilitate explanation of the invention. It is not intended to limit the invention to any specific orientation of the shock strut. Referring now to FIG. 3, a cross-section with parts broken away of a shock strut 200 is presented, according to an aspect of the invention, having a greatly reduced or eliminated tendency to induce jouncing. Shock strut 200 is generally similar to shock strut 100 in having a piston structure 202, a cylinder structure 204, a support tube 214, a circumferential seal 222, at least one fixed orifice 218, at least one pressure relief orifice 220, and openings 224 and 226, all similar to the corresponding components of shock strut 100 presented in FIGS. 1 and 2. Piston structure 202 and hollow cylinder structure 204 together define a sealed elongate cavity (not shown in FIG. 3) at least partially filled with liquid, similar to sealed elongate cavity 106. At least a portion of the elongate cavity within shock strut 200 may comprise a gas. An improved piston head 208 separates the elongate cavity into an upper cavity 210 and a lower cavity 212.

Improved piston head 208 is generally similar to piston head 108, however, improved piston head 208 comprises a damped valve poppet 228 having an additional damper device 240. Damped valve poppet 228 is received within the piston head 208 moveable from a first position wherein the damped valve poppet 228 covers the pressure relief orifice 220 to a second position that uncovers the pressure relief orifice 220. Damped valve poppet 228 comprises a venting orifice, and a cylindrical probe 232 having an upper portion 234 exposed to pressure in the upper cavity 210 and a lower portion 236 exposed to pressure in the lower cavity 212. Upper portion 234 and lower portion 236, in cooperation with the piston head 208, define a hydraulic area across which the change in pressure acts. A spring 238 urges the damped valve poppet 228 into a first position with a predetermined force wherein the damped valve poppet 228 covers pressure relief orifice 220. Venting orifice, cylindrical probe 232, upper portion 234, and lower portion 236, are generally similar to the corresponding components of piston head 108 of FIG. 2. Cylindrical probe 232 is closely fitted to a mating surface on the piston head 208 to provide an effective seal between the upper cavity 210 and lower cavity 212 under dynamic conditions when the piston structure 202 and cylinder structure 204 rapidly move together. Openings 231 in damped valve poppet 228 place the underside of damped valve poppet 228 in fluid communication with the rest of upper cavity 226. Under dynamic conditions, the upper and lower portions 234 and 236, and piston head 208 cooperate to define a hydraulic area across which the change in pressure acts and develops an upward force on the damped valve poppet 228.

In operation, relative telescoping movement ("stroking") of the cylinder structure 204 and the piston structure 202 toward each other increases pressure in the lower cavity thereby developing a change in pressure across the piston head 208 that causes the liquid to flow from the lower cavity 212 to the upper cavity 210 through the fixed orifice 218. Upper portion 234 and lower portion 236, in cooperation with the piston head 208, define a hydraulic area across which the change in pressure acts. The change in pressure acting across the lower portion 236 and the upper portion 234 develops a force acting against the spring 238 that moves the damped valve poppet 228 from the first position to the second position upon the force exceeding the predetermined force. Moving the damped valve poppet 228 to the second position uncovers the pressure relief orifice 220 via venting orifice 230 upon which the change in pressure causes the liquid to flow from the lower cavity 212 to the upper cavity 210 through the pressure relief orifice 220 and venting orifice 230. The valve poppet 228 begins to move to the second position when the pressure across the piston head 208 exceeds a predetermined value due to the fixed orifice 218 being unable to pass enough fluid to keep the change in pressure from exceeding the predetermined value, so the pressure relief orifice 220 opens to provide an additional flow path. Opening the pressure relief orifice 220 decreases the change in pressure across the piston head. The spring 228 returns the damped valve poppet 228 to the first position upon the force decreasing to less than the predetermined force. The damped valve poppet may oscillate between the first and second positions in response to loading conditions imposed on the shock strut, thereby maintaining a generally constant predetermined change in pressure across the piston head 208. The damped valve poppet 228 and the spring 238 cooperate to provide a generally constant predetermined change in pressure across the piston head that is generally independent of piston head speed, and thereby providing a fluid amplification force that is generally independent of the relative speed of the piston structure 202 toward the cylinder structure 204.

The spring 238 determines the predetermined force at which the valve poppet 228 begins to move. A helical spring 238 is used which has spring constant, resulting in some change in the spring force as the valve poppet moves from the first position to the second position. The change in spring force from the first position to the second position is minimized in order to narrow the target band for the generally constant predetermined change in pressure across the piston head 208. According to a preferred embodiment, the change in spring force is minimized by minimizing the spring constant of helical spring 238.

Figure 4:
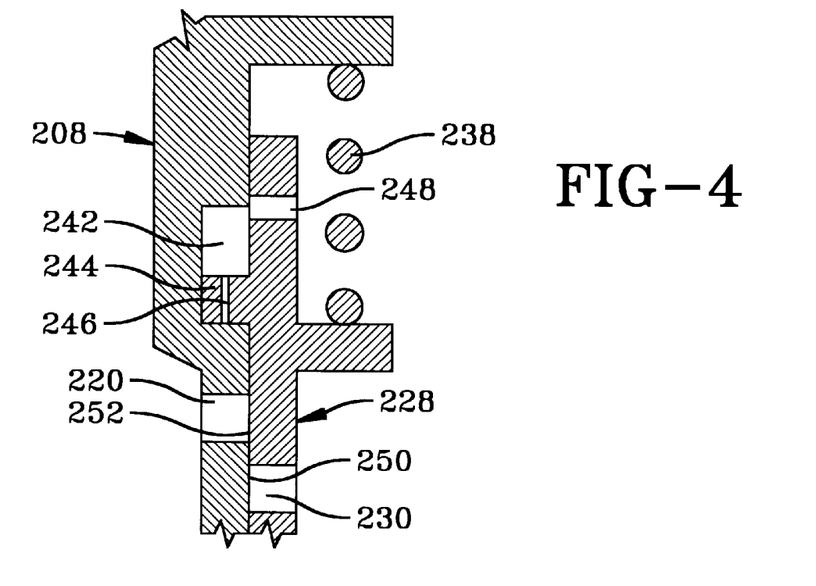
FIG. 4 presents a detailed cross-sectional view of a portion of FIG. 3 with the damped valve poppet in the first position.
Figure 5:
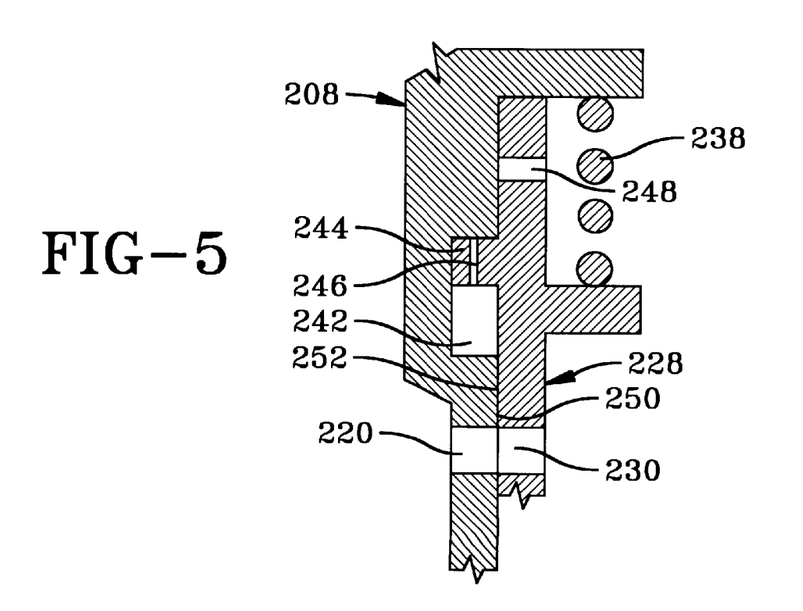
FIG. 5 presents a detailed cross-sectional view of similar to FIG. 4, but with the damped valve poppet in the second position.

The additional damper device 240, and its operation, is shown in more detail in FIGS. 4 and 5. Referring specifically to FIG. 4, a detailed view is presented of the portion of FIG. 3 designated 4—4 with the damped valve poppet 228 in the first position. The damped valve poppet 228 and the piston head 208 together define a damping cavity 242 filled with liquid. The additional damper device 240 comprises a damping flange 244 protruding from the damped valve poppet 228 into the damping cavity 242. The damping flange defines a damping orifice 246, wherein movement of the damped valve poppet 228 causes movement of the damping flange 244 within the damping cavity thereby forcing liquid within the damping cavity to flow through the damping flange orifice 246, resulting in dynamic damping of the damped valve poppet 228. In the example presented in FIG. 4, the damped valve poppet 228 has at least one access port 248 through which liquid within the upper cavity 110 is in fluid communication with the damping cavity 242 when the damped valve poppet 228 is located at the first position. Access port 248 allows air to escape the damping cavity 242 during filling of the shock strut 200 with liquid. According to one embodiment, the access port 248 is generally aligned with the upper edge of the damping cavity 242 to minimize or eliminate any pocket of air that may form at the top of the damping cavity 242. A detailed view showing damped valve poppet in the second position is presented in FIG. 5. As shown in FIG. 5, moving the valve poppet 228 causes trapped fluid within damping cavity 242 to pump from one side of the damping flange 244 to the other as the damped valve poppet 228 moves to the second position and back to the first position.

The dynamic damping of the damped valve poppet 228 greatly increases damping of the movement of the damped valve poppet 228, resulting in greatly reduced or eliminated jouncing upon impact on the shock strut 200. Shock strut 200 has greatly improved performance relative to shock strut 100, and may be used in certain applications for which shock strut I 00 is unacceptable. According to a preferred embodiment, the piston head 208 comprises a generally cylindrical inside surface 250 and the damped valve poppet 228 comprises a mating generally cylindrical outside surface 252 concentric with the inside surface 250, the inside surface 250 having a ring-like recess covered by the outside surface thereby defining a damping cavity 242, as shown in FIGS. 3–5. The damping flange preferably protrudes from the outside surface 252 into the damping cavity 242. Though described with respect to specific embodiments, various damping arrangements and damping orifice configurations are evident to those skilled in the art, any of which are considered to fall within the purview of the invention.

Figure 6:
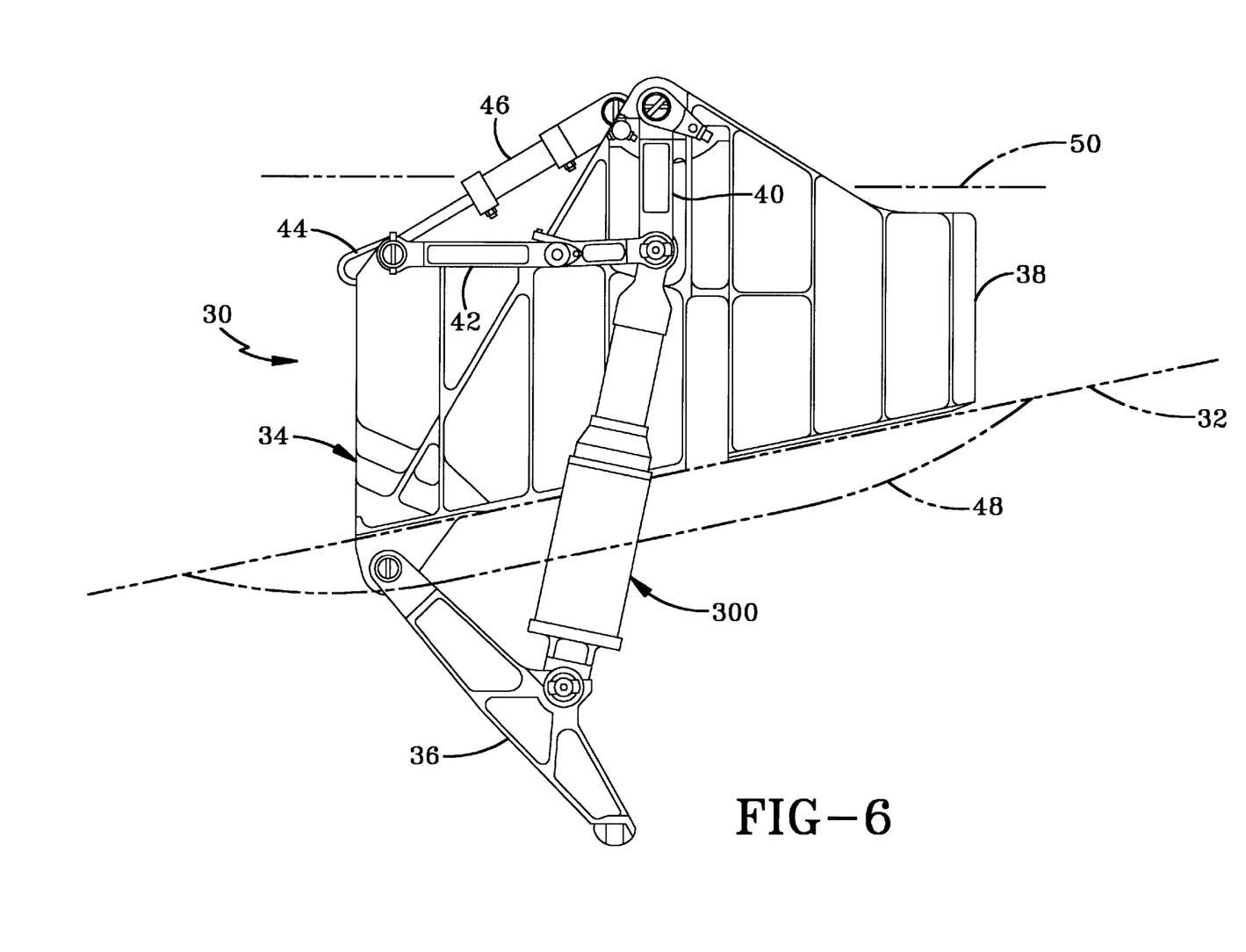
FIG. 6 presents a side view of a tail skid apparatus utilizing a shock strut according to an aspect of the invention.

Referring now to FIG. 6, an apparatus 30 is presented for slowing movement of an aircraft structure 32 toward the ground, according to an aspect of the invention. In this example, the aircraft structure 32 is the tail portion of an aircraft. The apparatus 30 comprises a shock strut 300, an attachment structure 34 that attaches the shock strut 300 to the aircraft structure 32, and an impact structure 36 attached to the shock strut 300 configured to transfer impact forces from the ground to the shock strut 300. In this example, the impact structure 36 is a tail skid. The apparatus 30 is useful for preventing tail-strike of an aircraft in the event of over-rotation of the aircraft on take-off. The attachment structure comprises a frame 38 attached to the aircraft structure 32. The shock strut 300 is pivotally attached to one end of the tail skid 36 and to one end of a retract linkage 40. The other end of the tail skid 36 is pivotally attached to the frame 38. The retract linkage 40 and one end of the shock strut 300 are pivotally connected to one end of a two piece locking linkage 42. The other end of the two piece locking linkage is pivotally attached to the frame 38. A retract crank 44 is fixed to one end of the locking linkage 42 via a pin that passes through the frame. One end of a retract actuator 46 is pivotally attached to the retract crank 44, and the other end of the retract actuator 46 is pivotally attached to the frame 38. Activating the retract actuator 46 causes the retract actuator 46 to contract which rotates the retract crank counter-clockwise releasing and rotating the locking linkage 42 upward. The upward rotation of the locking linkage 42 rotates the retract linkage 40 clockwise which pulls the shock strut 300 and tail skid 36 up inside the aircraft structure 32 into a fixed retracted position. Reversing this process lowers the tail skid. A fairing 48 (shown in phantom) may be provided, and the top of apparatus 30 may conveniently correspond to the aircraft service deck 50 (shown in phantom).

Figure 7:
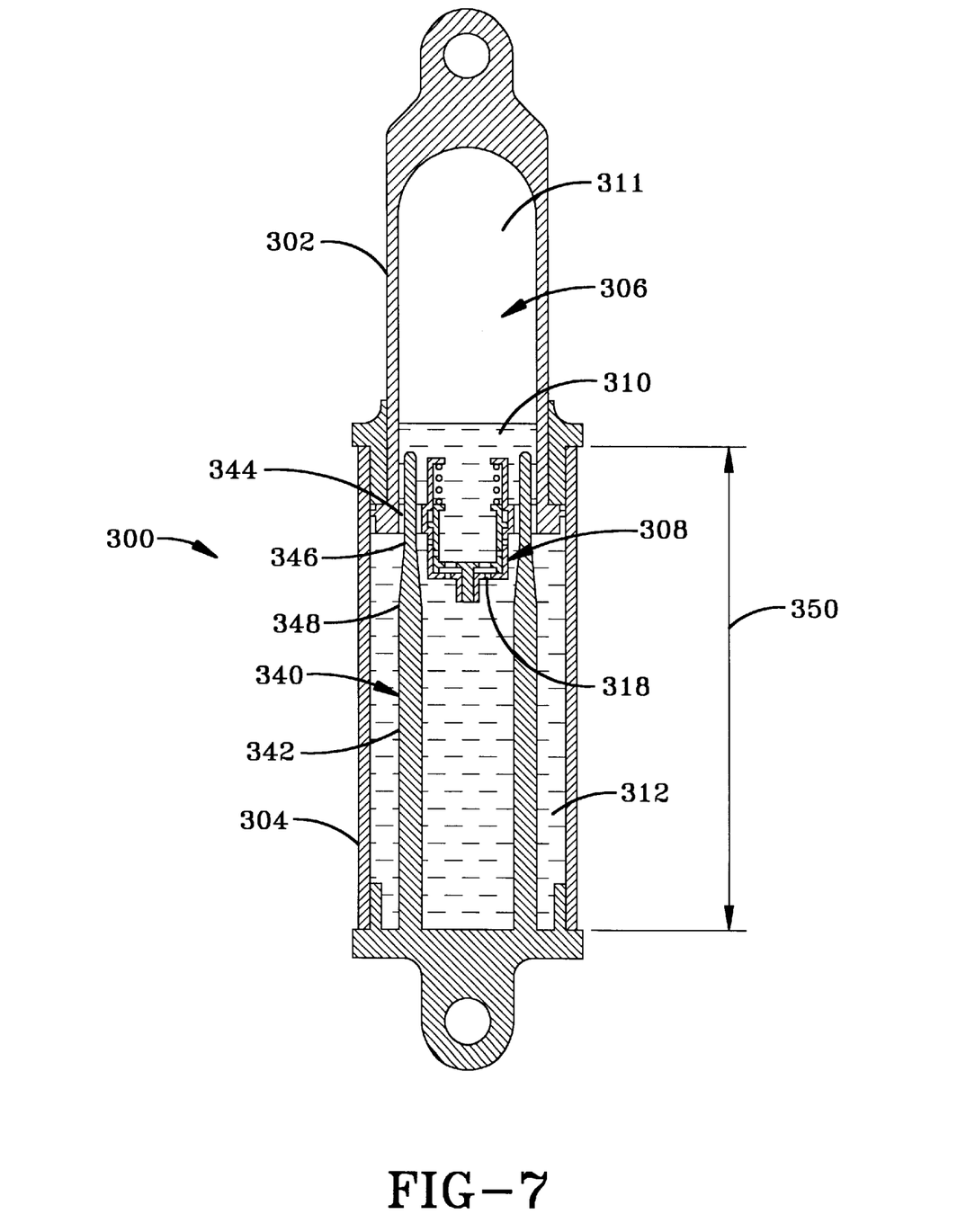
FIG. 7 presents a schematical cross-sectional view of the shock strut utilized in the FIG. 6 tail skid apparatus.

Referring now to FIG. 7, a cross-sectional view of shock strut 300 is presented. Shock strut 300 is generally cylindrical and comprises a piston structure 302 and a hollow cylinder structure 304. The cylinder structure 304 receives the piston structure 302 and defines a sealed elongate cavity 306 at least partially filled with liquid, and preferably having a portion 311 filled with gas. In a tail skid application, the ratio of gas to liquid is such that the overall spring rate of the shock strut 300 is minimized. Minimizing the gas spring rate results in a more constant overall stroking force versus shock strut stroke. Piston structure 302 comprises a piston head 308 generally similar to piston head 208, that divides the elongate cavity 306 into an upper cavity 310 and a lower cavity 312. Piston head 308 has a spring and damped valve poppet and other features of piston head 208 previously discussed in relation to FIGS. 3–5, such description being equally applicable here. In shock strut 300, the fixed orifices 318 are in the face of the piston head 308. In addition, shock strut 300 has at least one onset softener comprising 340 comprising a tapered rod 342 and an onset softener orifice 344. The tapered rod 342 may be generally cylindrical and preferably increases from an initial cross-sectional area at a position indicated as 346, to a final cross-sectional area at a position 348. The onset softener orifice 344 may be circular in cross-section, and preferably closely mates the cross-sectional area of the tapered rod at position 348. This feature essentially closes the onset softener orifice 344 at a predetermined stroke position. Thus, the onset softener 340 initially provides a relatively large flow area that prevents spikes in the change in pressure across the piston head when the piston 302 just begins to stroke, and subsequently closes to permit control of the change in pressure via the fixed orifices 318, the pressure relief orifices, the damped valve poppet, etc., as previously described in relation to FIGS. 3–5.

In a certain application, an apparatus as presented in FIG. 6 may be used to prevent over-rotation and tail strike of a large commercial airliner during take-off. A shock strut 300 for such application has a cylinder 304 having an inside diameter of about 6.5 inches, a cylinder length 350 of about 12.75 inches, and a wall thickness of about 0.2 inches. The material forming the cylinder 304 has a Young's Modulus of about 29,000 ksi. The target pressure in lower chamber 312 is about 6000 psig, with a goal of maintaining this pressure generally constant and independent of piston head speed. The gas portion 311 is filled with nitrogen at a pressure of about 100 psig with a volume of about 200 cubic inches when the shock strut 300 is fully extended (as shown in FIG. 7). The liquid partially filling the elongate cavity 306 is a hydraulic oil having a specific weight of about 0.031 pounds/cubic inch and a bulk modulus of about 285 ksi. The hydraulic area of the cylindrical probe across which the change in pressure acts is about 0.032 square inches. The spring rate of the valve poppet spring is about 184.3 pounds/inch. The predetermined force with the damped valve poppet in the first position is about 183.8 pounds, and the spring is compressed about 1.99 inches when installed. The hydraulic area of the annular damping flange (see 244 in FIG. 4) is about 0.55 square inches. The damping orifices have a cumulative cross-sectional area of 0.01 square inches. The damped valve poppet has a mass of about 0.67 pounds. The pressure relief orifice has a diameter of about 0.32 inches and eight such orifices are provided. The pressure relief orifice and venting orifice are arranged such that the pressure relief orifice begins to uncover when the damped valve poppet strokes about 0.01 inches from the first position. The flow area thus opened versus damped valve poppet position is a matter of geometry depending on the shape of the pressure relief orifice and the venting orifice. Circular cross-sections are adequate and facilitate manufacture, and are used in shock strut 300. Change in liquid momentum through the pressure relief orifice and the venting orifice may be considered in calculating forces on the piston head. The fixed orifices 318 in the piston head 308 have a cumulative area of about 0.0061 square inches. Two onset softeners 342 are provided. The flow area through the onset softener orifice 344 with the tapered rod 342 partially filling the orifice is about 0.100 square inches with the shock strut fully extended, and remains constant until position 346 of the tapered rod 342 begins to enter the onset softener orifice 344. The position 346 begins to enter the orifice 344 when the piston head strokes about 0.38 inches from the fully extended position of shock strut 300. The flow area through the onset softener decreases with increasing stroke and becomes essentially zero when position 348 of the tapered rod 342 enters the onset softener orifice at a piston head stroke of about 2 inches from the fully extended position of shock strut 300. The pressure drops through the various orifices may be calculated according to known relationships based on Bernoulli's Equation.

Figure 8:
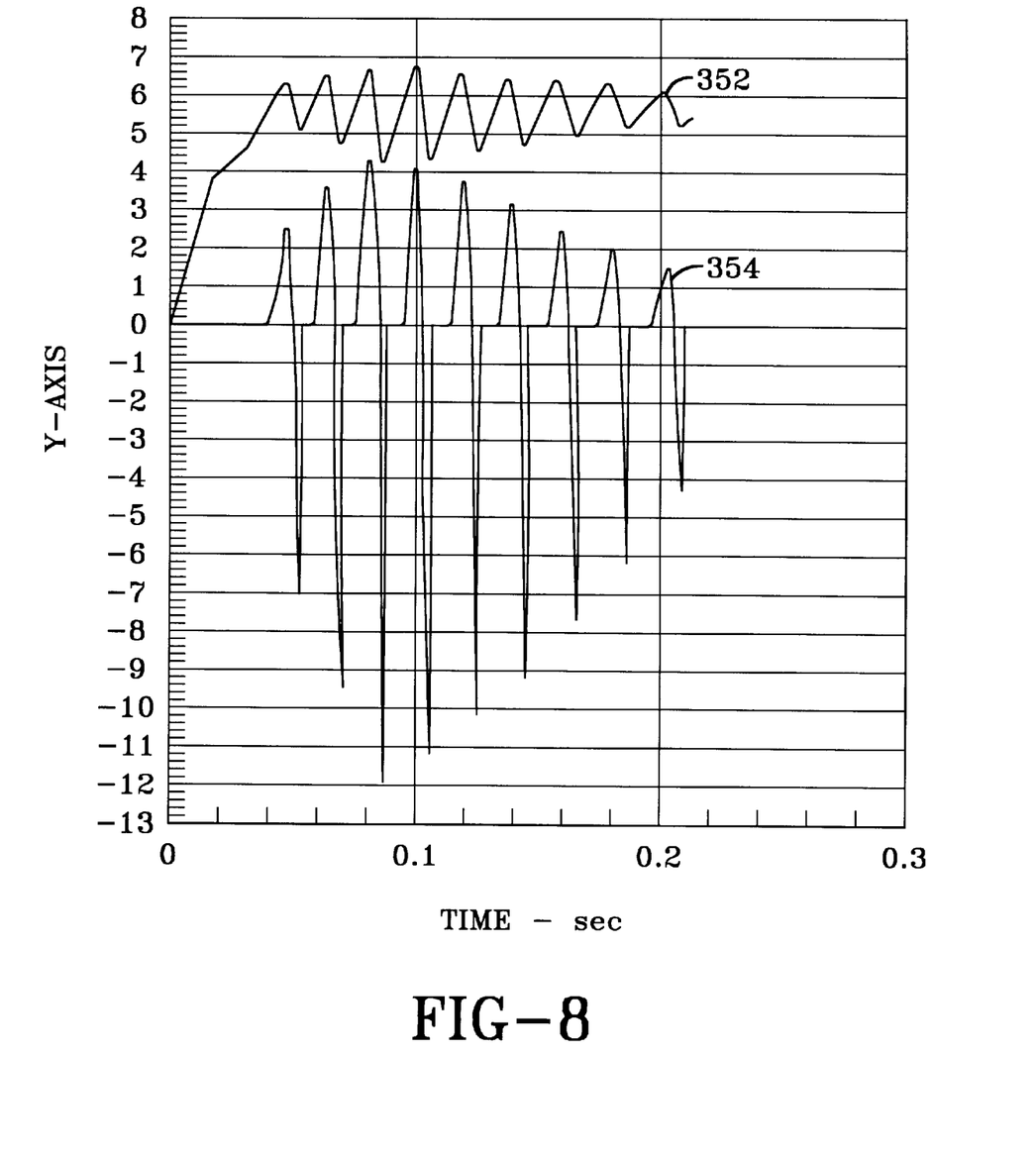
FIG. 8 presents a plot of certain data for a shock strut without valve poppet damping.
Figure 9:
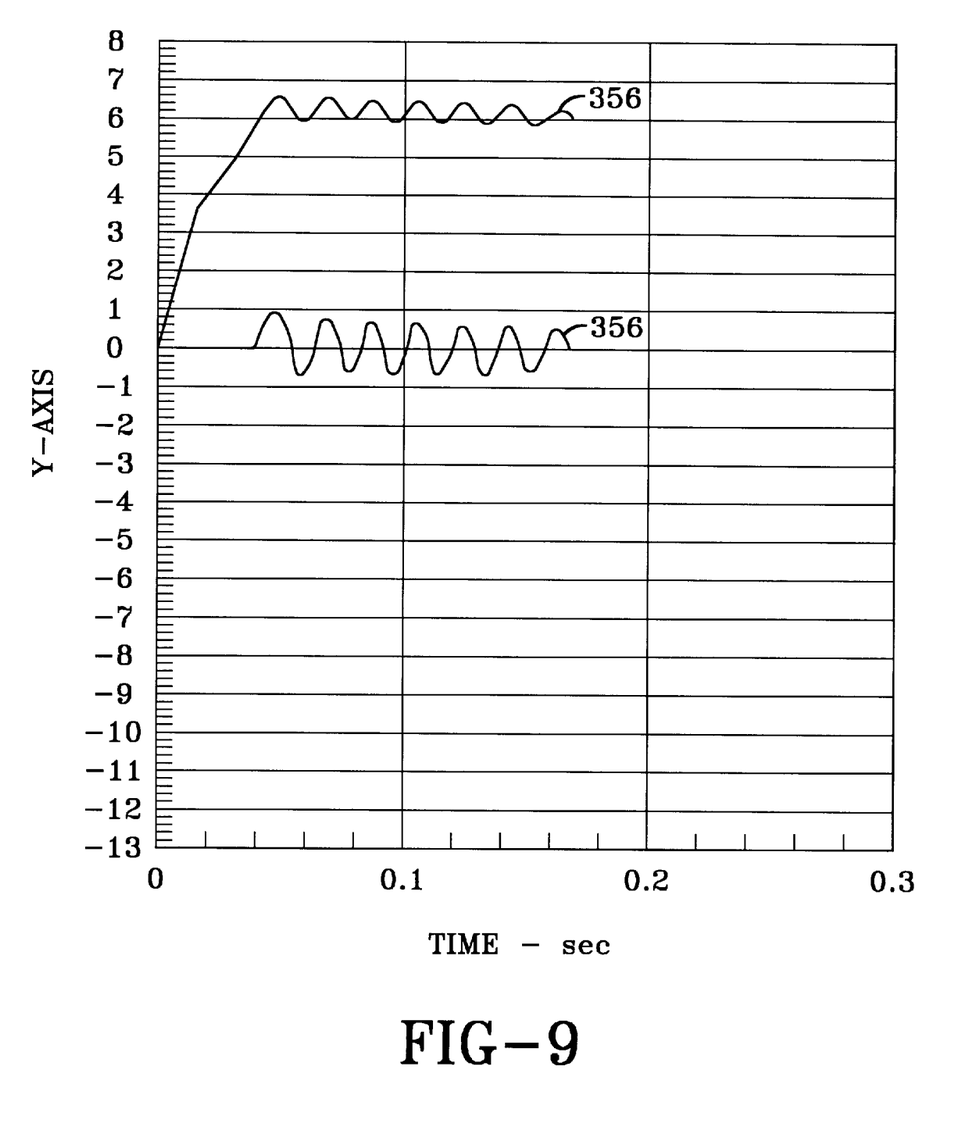
FIG. 9 presents a plot of certain data for a shock strut with valve poppet damping.

Referring now to FIG. 8, a plot of pressure in lower chamber 312 and valve poppet velocity versus time from an analysis of a certain case without valve poppet damping, wherein the aircraft structure moves downward with an effective weight of about 123,000 pounds with an initial velocity of about 24 inches/second and decreases to about 5 inches/second. The various features of the shock strut 300 are as described in the previous paragraph. In this case, the shock strut 300 strokes about 3.79 inches. Each gradation on the Y-Axis corresponds to 1000 psi for pressure, and 10 inches per second for velocity. Pressure in the lower chamber is indicated by trace 352, and velocity of the undamped valve poppet is indicated by trace 354. Note the extreme variations in valve poppet velocity and the corresponding variations in lower chamber pressure. Referring now to FIG. 9, a plot of pressure in lower chamber 312 and valve poppet velocity versus time from an analysis of a certain case with valve poppet damping, wherein the aircraft structure moves downward with an effective weight of about 123,000 pounds with an initial velocity of about 24 inches/second and decreases to about 5 inches/second. The various features of the shock strut 300 are as described in the previous paragraph. In this case, the shock strut 300 strokes about 3.06 inches. The scale in FIG. 9 is the same in FIG. 8. Pressure in the lower chamber is indicated by trace 356, and velocity of the undamped valve poppet is indicated by trace 358. Note that the variations in valve poppet velocity and the corresponding variations in lower chamber pressure are greatly reduced relative to FIG. 9.

It is evident that many variations are possible without departing from the true scope and spirit of the invention as defined by the claims that follow.

I claim:

1. A shock strut that attaches to an aircraft structure for slowing movement of the aircraft structure toward the ground, the shock strut comprising:

an elongate piston structure;

a hollow elongate cylinder structure, said cylinder structure receiving said piston structure in a manner that permits relative telescoping movement between said cylinder structure and said piston structure, said piston structure and said cylinder structure defining a sealed elongate cavity at least partially filled with a liquid;

a piston head attached to said piston structure that divides said elongate cavity into an upper cavity and a lower cavity, said piston head having at least one fixed orifice and at least one pressure relief orifice, wherein relative telescoping movement of said cylinder structure and said piston structure toward each other increases pressure in said lower cavity thereby developing a change in pressure across said piston head that causes said liquid to flow from said lower cavity to said upper cavity through said fixed orifice;

a damped valve poppet received within said piston head moveable from a first position wherein said damped valve poppet covers said pressure relief orifice to a second position that uncovers said pressure relief orifice, said damped valve poppet having an additional damper device that damps movement of said damped valve poppet, said damped valve poppet having an upper portion exposed to liquid in said upper cavity and a lower portion exposed to liquid in said lower cavity; and, a spring urging said damped valve poppet into said first position with a predetermined force, said change in pressure acting across said damped valve poppet lower portion and said damped valve poppet upper portion and developing a force acting against said spring that moves said damped valve poppet from said first position to said second position upon said force exceeding said predetermined force and uncovering said pressure relief orifice upon which said change in pressure causes said liquid to flow from said lower cavity to said upper cavity through said pressure relief orifice thereby decreasing said change in pressure, said spring returning said damped valve poppet to said first position upon said force decreasing to less than said predetermined force.

2. The shock strut of claim 1, wherein said poppet valve and said spring cooperate to provide a generally constant predetermined change in pressure across said piston head that is generally independent of piston head speed.

3. The shock strut of claim 1, wherein at least a portion of said elongate cavity comprises a gas.

4. The shock strut of claim 1, wherein said poppet valve and said spring cooperate to provide a generally constant predetermined change in pressure across said piston head that is generally independent of piston head speed; and, wherein a change in spring force from the first position to the second position is minimized in order to provide a narrow target band for said generally constant predetermined change in pressure across said piston head.

5. An apparatus for slowing movement of an aircraft structure toward the ground, the apparatus comprising:

(a) a shock strut, said shock strut comprising, an elongate piston structure, a hollow elongate cylinder structure, said cylinder structure receiving said piston structure in a manner that permits relative telescoping movement between said cylinder structure and said piston structure, said piston structure and said cylinder structure defining a sealed elongate cavity at least partially filled with a liquid, a piston head attached to said piston structure that divides said elongate cavity into an upper cavity and a lower cavity, said piston head having at least one fixed orifice and at least one pressure relief orifice, wherein relative telescoping movement of said cylinder structure and said piston structure toward each other increases pressure in said lower cavity thereby developing a change in pressure across said piston head that causes said liquid to flow from said lower cavity to said upper cavity through said fixed orifice, a damped valve poppet received within said piston head moveable from a first position wherein said damped valve poppet covers said pressure relief orifice to a second position that uncovers said pressure relief orifice, said damped valve poppet having an additional damper device that damps movement of said damped valve poppet, said damped valve poppet having an upper portion exposed to liquid in said upper cavity and a lower portion exposed to liquid in said lower cavity, and a spring urging said damped valve poppet into said first position with a predetermined force, said change in pressure acting across said damped valve poppet lower portion and said damped valve poppet upper portion and developing a force acting against said spring that moves said damped valve poppet from said first position to said second position upon said force exceeding said predetermined force and uncovering said pressure relief orifice upon which said change in pressure causes said liquid to flow from said lower cavity to said upper cavity through said pressure relief orifice thereby decreasing said change in pressure, said spring returning said damped valve poppet to said first position upon said force decreasing to less than said predetermined force;

(b) an attachment structure that attaches said shock strut to the aircraft structure; and, (c) an impact structure attached to said shock strut configured to transfer impact forces from the ground to the shock strut.

6. The apparatus of claim 5, wherein said poppet valve and said spring cooperate to provide a generally constant predetermined change in pressure across said piston head that is generally independent of piston head speed.

7. The apparatus of claim 5, wherein at least a portion of said elongate cavity comprises a gas.

8. A shock strut that attaches to an aircraft structure for slowing movement of the aircraft structure toward the ground, the shock strut comprising:

an elongate piston structure;

a hollow elongate cylinder structure, said cylinder structure receiving said piston structure in a manner that permits relative telescoping movement between said cylinder structure and said piston structure, said piston structure and said cylinder structure defining a sealed elongate cavity at least partially filled with a liquid;

a piston head attached to said piston structure that divides said elongate cavity into an upper cavity and a lower cavity, said piston head having at least one fixed orifice and at least one pressure relief orifice, wherein relative telescoping movement of said cylinder structure and said piston structure toward each other increases pressure in said lower cavity thereby developing a change in pressure across said piston head that causes said liquid to flow from said lower cavity to said upper cavity through said fixed orifice;

a damped valve poppet received within said piston head moveable from a first position wherein said damped valve poppet covers said pressure relief orifice to a second position that uncovers said pressure relief orifice, said damped valve poppet having a damper device that damps movement of said damped valve poppet, said damped valve poppet having an upper portion exposed to liquid in said upper cavity and a lower portion exposed to liquid in said lower cavity, wherein said damped valve poppet and said piston head together define a damping cavity filled with liquid, and said damper device comprises a damping flange protruding from said damped valve poppet into said damping cavity, said damping flange defining a damping orifice, wherein movement of said damped valve poppet causes movement of said damping flange within said damping cavity thereby forcing liquid within said damping cavity to flow through said damping flange orifice; and, a spring urging said damped valve poppet into said first position with a predetermined force, said change in pressure acting across said damped valve poppet lower portion and said damped valve poppet upper portion and developing a force acting against said spring that moves said damped valve poppet from said first position to said second position upon said force exceeding said predetermined force and uncovering said pressure relief orifice upon which said change in pressure causes said liquid to flow from said lower cavity to said upper cavity through said pressure relief orifice thereby decreasing said change in pressure, said spring returning said damped valve poppet to said first position upon said force decreasing to less than said predetermined force.

9. The shock strut of claim 8, said damped valve poppet having at least one access port through which liquid within said elongate cavity is in fluid communication with said damping cavity when said damped valve poppet is located at said first position, wherein movement of said damped valve poppet from said first position closes said access port and causes movement of said damping flange within said damping cavity thereby forcing liquid within said damping cavity to flow through said damping flange orifice.

10. A shock strut that attaches to an aircraft structure for slowing movement of the aircraft structure toward the ground, the shock strut comprising:

an elongate piston structure;

a hollow elongate cylinder structure, said cylinder structure receiving said piston structure in a manner that permits relative telescoping movement between said cylinder structure and said piston structure, said piston structure and said cylinder structure defining a sealed elongate cavity at least partially filled with a liquid;

a piston head attached to said piston structure that divides said elongate cavity into an upper cavity and a lower cavity, said piston head having at least one fixed orifice and at least one pressure relief orifice, wherein relative telescoping movement of said cylinder structure and said piston structure toward each other increases pressure in said lower cavity thereby developing a change in pressure across said piston head that causes said liquid to flow from said lower cavity to said upper cavity through said fixed orifice;

a damped valve poppet received within said piston head moveable from a first position wherein said damped valve poppet covers said pressure relief orifice to a second position that uncovers said pressure relief orifice, said damped valve poppet having a damper device that damps movement of said damped valve poppet, said damped valve poppet having an upper portion exposed to liquid in said upper cavity and a lower portion exposed to liquid in said lower cavity, wherein said piston head comprises a generally cylindrical inside surface and said damped valve poppet comprises a mating generally cylindrical outside surface concentric with said inside surface, said inside surface having a ring-like recess covered by said outside surface thereby defining a damping cavity, said damper device comprising a damping flange protruding from said outside surface into said damping cavity, said damping flange defining a damping orifice, wherein movement of said damped valve poppet causes liquid within said damping cavity to flow through said damping orifice; and, a spring urging said damped valve poppet into said first position with a predetermined force, said change in pressure acting across said damped valve poppet lower portion and said damped valve poppet upper portion and developing a force acting against said spring that moves said damped valve poppet from said first position to said second position upon said force exceeding said predetermined force and uncovering said pressure relief orifice upon which said change in pressure causes said liquid to flow from said lower cavity to said upper cavity through said pressure relief orifice thereby decreasing said change in pressure, said spring returning said damped valve poppet to said first position upon said force decreasing to less than said predetermined force.

11. The shock strut of claim 10, said damped valve poppet having at least one access port through which liquid within said elongate cavity is in fluid communication with said damping cavity when said damped valve poppet is located at said first position, wherein movement of said damped valve poppet from said first position moves said access port to a position where said access port is covered by said inside cylindrical surface.

12. An apparatus for slowing movement of an aircraft structure toward the ground, the apparatus comprising:

(a) a shock strut, said shock strut comprising, an elongate piston structure, a hollow elongate cylinder structure, said cylinder structure receiving said piston structure in a manner that permits relative telescoping movement between said cylinder structure and said piston structure, said piston structure and said cylinder structure defining a sealed elongate cavity at least partially filled with a liquid, a piston head attached to said piston structure that divides said elongate cavity into an upper cavity and a lower cavity, said piston head having at least one fixed orifice and at least one pressure relief orifice, wherein relative telescoping movement of said cylinder structure and said piston structure toward each other increases pressure in said lower cavity thereby developing a change in pressure across said piston head that causes said liquid to flow from said lower cavity to said upper cavity through said fixed orifice, a damped valve poppet received within said piston head moveable from a first position wherein said damped valve poppet covers said pressure relief orifice to a second position that uncovers said pressure relief orifice, said damped valve poppet having a damper device that damps movement of said damped valve poppet, said damped valve poppet having an upper portion exposed to liquid in said upper cavity and a lower portion exposed to liquid in said lower cavity, wherein said damped valve poppet and said piston head together define a damping cavity filled with liquid, and said damper device comprises a damping flange protruding from said damped valve poppet into said damping cavity, said damping flange defining a damping orifice, wherein movement of said damped valve poppet causes movement of said damping flange within said damping cavity thereby forcing liquid within said damping cavity to flow through said damping flange orifice, and a spring urging said damped valve poppet into said first position with a predetermined force, said change in pressure acting across said damped valve poppet lower portion and said damped valve poppet upper portion and developing a force acting against said spring that moves said damped valve poppet from said first position to said second position upon said force exceeding said predetermined force and uncovering said pressure relief orifice upon which said change in pressure causes said liquid to flow from said lower cavity to said upper cavity through said pressure relief orifice thereby decreasing said change in pressure, said spring returning said damped valve poppet to said first position upon said force decreasing to less than said predetermined force;

(b) an attachment structure that attaches said shock strut to the aircraft structure; and, (c) an impact structure attached to said shock strut configured to transfer impact forces from the ground to the shock strut.

13. The apparatus of claim 12, said damped valve poppet having at least one access port through which liquid within said elongate cavity is in fluid communication with said damping cavity when said damped valve poppet is located at said first position, wherein movement of said damped valve poppet from said first position closes said access port.

14. The apparatus of claim 12, wherein said impact structure is a wheel and tire assembly.

15. The apparatus of claim 12, wherein said impact structure is a tail skid.

16. An apparatus for slowing movement of an aircraft structure toward the ground, the apparatus comprising:

(a) a shock strut, said shock strut comprising, an elongate piston structure, a hollow elongate cylinder structure, said cylinder structure receiving said piston structure in a manner that permits relative telescoping movement between said cylinder structure and said piston structure, said piston structure and said cylinder structure defining a sealed elongate cavity at least partially filled with a liquid, a piston head attached to said piston structure that divides said elongate cavity into an upper cavity and a lower cavity, said piston head having at least one fixed orifice and at least one pressure relief orifice, wherein relative telescoping movement of said cylinder structure and said piston structure and said piston structure toward each other increases pressure in said lower cavity thereby developing a change in pressure across said piston head that causes said liquid to flow from said lower cavity to said upper cavity through said fixed orifice, a damped valve poppet received within said piston head moveable from a first position wherein said damped valve poppet covers said pressure relief orifice to a second position that uncovers said pressure relief orifice, said damped valve poppet having a damper device that damps movement of said damped valve poppet, said damped valve poppet having an upper portion exposed to liquid in said upper cavity and a lower portion exposed to liquid in said lower cavity, wherein said piston head comprises a generally cylindrical inside surface and said damped valve poppet comprises a mating generally cylindrical outside surface concentric with said inside surface, said inside surface having a ring-like recess covered by said outside surface thereby defining a damping cavity, said damper device comprising a damping flange protruding from said outside surface into said damping cavity, said damping flange defining a damping orifice, wherein movement of said damped valve poppet causes liquid within said damping cavity to flow through said damping orifice, and a spring urging said damped valve poppet into said first position with a predetermined force, said change in pressure acting across said damped valve poppet lower portion and said damped valve poppet upper portion and developing a force acting against said spring that moves said damped valve poppet from said first position to said second position upon said force exceeding said predetermined force and uncovering said pressure relief orifice upon which said change in pressure causes said liquid to flow from said lower cavity to said upper cavity through said pressure relief orifice thereby decreasing said change in pressure, said spring returning said damped valve poppet to said first position upon said force decreasing to less than said predetermined force;

(b) an attachment structure that attaches said shock strut to the aircraft structure; and, (c) an impact structure attached to said shock strut configured to transfer impact forces from the ground to the shock strut.

17. The apparatus of claim 16, said damped valve poppet having at least one access port through which liquid within said elongate cavity is in fluid communication with said damping cavity when said damped valve poppet is located at said first position, wherein movement of said damped valve poppet from said first position moves said access port to a position where said access port is covered by said inside cylindrical surface.

18. The apparatus of claim 16, wherein said impact structure is a wheel and tire assembly.

19. The apparatus of claim 16, wherein said impact structure is a tail skid.

* * * * *